(12) United States Patent
Jansen (10) Patent No.: US 12,271,324 B2
(45) Date of Patent: Apr. 8, 2025

(54) CONFIGURATION DATA CACHING (71) Applicant: WAGO Verwaltungsgesellschaft mbH, Minden (DE)

(72) Inventor: Jonathan Jansen, Minden (DE)

(73) Assignee: Wago Verwaltungsgesellschaft MBH, Minden (DE)

( * ) Notice: Subject to any disclaimer, the term of this patent is extended or adjusted under 35 U.S.C. 154(b) by 0 days.

(21) Appl. No.: 17/591,387

(22) Filed: Feb. 2, 2022

(65) Prior Publication Data

US 2022/0245075 A1    Aug. 4, 2022

(30) Foreign Application Priority Data

Feb. 2, 2021 (DE) .............. 10 2021 102 378.5

(51) Int. Cl.
| | | |
|---|---|---|
| G06F 13/20 | (2006.01) | |
| G06F 3/06 | (2006.01) | |
| G06F 11/10 | (2006.01) | |
| G06F 13/42 | (2006.01) | |

(52) U.S. Cl.
CPC .......... *G06F 13/20* (2013.01); *G06F 13/4282* (2013.01); *G06F 2213/40* (2013.01)

(58) Field of Classification Search
CPC .. G06F 13/20; G06F 13/4282; G06F 2213/40; G06F 3/061; G06F 3/0629; G06F 3/065; G06F 11/1004
USPC .......... 710/8, 10, 15, 62, 104, 305; 709/202, 709/206, 221
See application file for complete search history.

(56) References Cited

U.S. PATENT DOCUMENTS

| | | | | |
|---|---|---|---|---|
| 5,845,095 A | * | 12/1998 | Reed ...................... | G06F 9/4411 714/E11.019 |
| 6,108,300 A | * | 8/2000 | Coile ....................... | H04B 1/74 714/4.12 |
| 6,112,255 A | * | 8/2000 | Dunn .................. | G06F 11/1076 711/155 |
| 6,148,355 A | * | 11/2000 | Mahalingam ........... | G06F 1/206 710/104 |
| 6,907,331 B2 | * | 6/2005 | Paquet ............... | G05B 19/0428 710/110 |
| 8,370,574 B2 | * | 2/2013 | Ballard ................ | G11B 15/689 711/100 |
| 9,792,181 B2 | * | 10/2017 | Coronado ........... | G06F 11/1482 |
| 2002/0120723 A1 | * | 8/2002 | Forth ........................ | H04L 9/40 709/221 |
| 2006/0190682 A1 | * | 8/2006 | Noguchi ................... | G06F 9/52 711/114 |
| 2006/0217917 A1 | * | 9/2006 | Abe ........................ | G11C 29/86 702/119 |
| 2008/0123637 A1 | * | 5/2008 | Zolls .................. | B60R 16/0315 370/362 |
| 2008/0270651 A1 | * | 10/2008 | Kreiner ............... | H04L 67/1097 718/1 |

(Continued)

*Primary Examiner* — Idriss N Alrobaye
*Assistant Examiner* — Henry W Yu
(74) *Attorney, Agent, or Firm* — Muncy, Geissler, Olds & Lowe, P.C.

(57) ABSTRACT

An input/output module having a housing to connect the I/O module to a first module, an interface configured to exchange data with the first module, and a memory. The I/O module is set up to receive and/or store data, from which data information can be derived with regard to a configuration of the first module and to make this information available to a second module upon request.

10 Claims, 8 Drawing Sheets

(56) References Cited

U.S. PATENT DOCUMENTS

| | | | | |
|---|---|---|---|---|
| 2009/0248759 | A1* | 10/2009 | Okada | G06F 11/2071 |
| 2010/0318686 | A1* | 12/2010 | Ver Steeg | H04L 41/0856 |
| | | | | 709/217 |
| 2012/0294190 | A1* | 11/2012 | Okubo | H04L 61/103 |
| | | | | 370/254 |
| 2016/0054925 | A1* | 2/2016 | Wu | G06F 11/1417 |
| | | | | 711/103 |

\* cited by examiner

CONFIGURATION DATA CACHING

This nonprovisional application claims priority under 35 U.S.C. § 119(a) to German Patent Application No. 10 2021 102 378.5, which was filed in Germany on Feb. 2, 2021, and which is herein incorporated by reference.

BACKGROUND OF THE INVENTION

Field of the Invention

The present invention relates to the caching of data from which information can be derived with regard to the configuration of a module. In particular, the present invention relates to the caching of data from which information can be derived with regard to the configuration of a module in a further module, for example, an input/output module, I/O module.

Description of the Background Art

When a field device is connected to an I/O module, it may be necessary to configure the I/O module to operate the field device. The configuration can specify which data is to be derived from the signals that are read in via the inputs of the I/O module and to be transmitted to the head station. Furthermore, a configuration can specify which signals are to be derived from data received by the head station and to be output at the outputs of the I/O module. A new configuration can also be performed when an I/O module is reset (e.g., to the factory state) or a (defective) I/O module is replaced. It may also be necessary to configure the head station.

SUMMARY OF THE INVENTION

It is therefore an object of the present invention to provide an I/O module that includes a housing which is designed for linking the I/O module to a first module, an interface set up for exchanging data with the first module, and a memory, wherein the I/O module is set up to receive and/or store data from which information regarding the configuration of the first module can be derived, and to provide this information to a second module upon request.

The I/O module may comprise one or more inputs and/or outputs which are set up for reading in status signals and/or for emitting control signals, wherein the I/O module is configurable from the data with regard to a derivation of the data from the status signals or a derivation of the control signals.

An input or an output can be set up to connect a field device.

In this context, the term "I/O module", as used in the context of the present description and the claims, can be understood in particular as a device that can be connected to a head station or is connected during operation, which device connects one or more field devices with the head station and optionally (via the head station) with a higher-level controller. Furthermore, the term "head station", as used in the context of the present description and claims, can be understood as a component of a modular fieldbus node whose object is to make the data and/or services of the I/O modules connected to the head station available via the fieldbus to which the head station is connected.

The head station and the I/O module may be set up to exchange data by means of electrical signals over a wired transmission route (in particular a local bus). The term "local bus", as used in the context of the present description, can be understood in particular as a bus via which (only) the I/O modules connected to the head station are connected to each other or connected (directly) to the head station. In this context, the term "interface", as used in the present description and the claims, can be understood in particular as a bus interface which is set up for connection to the local bus.

Furthermore, the term "housing", as used in the context of the present description and the claims, can be understood in particular as a structure formed from a solid insulating material in which conductive structures are embedded, wherein the housing is typically designed in such a way that accidental contact with current-carrying conductors is prevented. In this context, the term "connect", as used in the context of the present description and the claims, can be understood in particular as the establishment of a frictional or form-fitting connection between housings by means of which several modules can be serially connected to each other.

Furthermore, the term "module", as used in the context of the present description and the claims, can be understood in particular as a device which can be connected to another device for the extension of the capabilities of same, wherein said device is set up to be extended by several modules. Furthermore, the term "processor", as used in the context of the present description and claims, can be understood in particular as an electronic device for processing machine-readable instructions. Furthermore, the term "memory", as used in the present description and claims, can be understood in particular as an electronic device for storing data and making it available at a later date.

Furthermore, the phrase "information regarding a configuration", as used in the context of the present description and claims, can be understood in particular as information from which follows how process images are to be produced (e.g., how to derive data from signals read in at the inputs of the I/O module and how said data is to be transmitted via the local bus/bus to the head station) and/or how signals are to be derived from data transmitted from the head station via the local bus to the I/O module (which signals, for example, are output at the outputs of the I/O module).

For example, field devices which provide status signals or process control signals may be connected to the inputs and/or to the outputs. In this context, the term "field device", as used in the context of the present description, is understood to be in particular sensors and/or actuators that are connected to the I/O module (with signal technology, for example, attached to the I/O module). Furthermore, the term "input" or the term "output", as used in the context of the present description and the claims, is understood to be in particular electrical connections, such as, for example, connection terminals.

The I/O module may be set up to provide said information to the second module if the I/O module determines that the second module replaces the first module.

The I/O module may be set up to provide said information to the second module on request when the second module indicates to the I/O module that it replaces the first module.

The I/O module and the first module may be included in a system, wherein the first module is also designed as an I/O module.

The I/O module and the first module may be included in a system, wherein the first module is formed as a head station of a modular fieldbus node and has a fieldbus interface and another bus interface for communication with the I/O module and is further set up to make the data and/or services of the I/O module available via the fieldbus.

The systems may comprise a third module, wherein the third module stores second information regarding a configuration of the first module and is set up to provide the second information to the second module.

A bus system according to the invention comprises a first user, a second user and a bus connecting the first user to the second user, wherein the first user has associated configuration data for the configuration of the first user, wherein the first user is set up to generate a data mirroring of the configuration data, wherein the first user and the second user are set up to transmit at least a portion of the data mirroring to the second user, wherein the second user is set up to store the portion of the data mirroring in a memory of the second user, wherein the first user and the second user are set up to transmit the portion of the data mirroring from the second user back to the first user and wherein the first user is set up to generate a new configuration of the first user based on the portion of the data mirroring.

In this context, the term "bus system", as used in the context of the present description and the claims, can be understood in particular as a system with several users (nodes) which exchange data with each other via a shared bus line. Furthermore, the term "data mirroring" as used in the present description and claims, is understood to be in particular the generation of an exact copy of the data. If the first user is an I/O module, the generation can be initiated/triggered by the head station, whereas the copying to the bus is performed by the I/O module itself. The head station can then decide on the distribution of the portions of the data mirroring (to itself and/or to other I/O modules).

A user of a bus system may be designed as an I/O module and may have the following. A bus interface set up to exchange data with a further user, a processor, a memory and one or more electrical connections, set up for reading in input signals and/or for outputting output signals, wherein the input-output module is set up to derive data from the input signals and/or to derive output signals from the data and to receive and store configuration data of the other user, from which information regarding a configuration of the other user can be derived and to provide this information to the other user on request.

The other user can be the head station or an I/O module.

The configuration data can comprise value ranges, filter times, sampling rates, correction values (offset, gradient), polynomials, etc.

A method according to the invention for aligning a configuration of a second module with a configuration of a first module, which is replaced by the second module, comprises a transmission of data, from which information can be derived with regard to a configuration of the first module, to a third module, with which the first module is mechanically and electrically connected, and a transmission of information by the third module to the second module.

The method may also include a transmission of data, from which second information can be derived with regard to the configuration of the first module, to a fourth module, with which the first module is mechanically and electrically connected, and a transmission of said second information by the fourth module to the second module.

The second information and the information provided by the first module can be redundant to each other.

The modules can be part of a modular fieldbus node.

A method according to the invention for the configuration of a first user of a bus system with configuration data associated with the first user may comprise the steps of generating a data mirroring of the configuration data by the first user, transmitting at least a portion of the data mirroring to a second user of the bus system, storing the portion of the data mirroring in a memory of the second user, retransmitting the portion of the data mirroring from the second user to the first user and generating a new configuration based on the portion of the data mirroring in the first user.

The content of the new configuration can be identical to the previous configuration.

The reverse transmission can be started if it is determined that the first user has been replaced by an identical device (e.g., by the first user itself or by another user) and/or it is determined that the configuration data of the first user is at least partially unavailable and/or an integrity check of the configuration data and the data mirroring is initiated and/or an error of a redundancy check value (CRC) is determined via the configuration data.

Storing the portion of the data mirroring can occur when a redundancy check value (CRC) about the data mirroring is correct (i.e., at most, correctable errors occur), wherein the storing of the portion of the data mirroring is confirmed.

It is understood that the steps carried out by an I/O module, a (bus) system, or a user of a bus system can be regarded as steps of a corresponding method, and vice versa.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
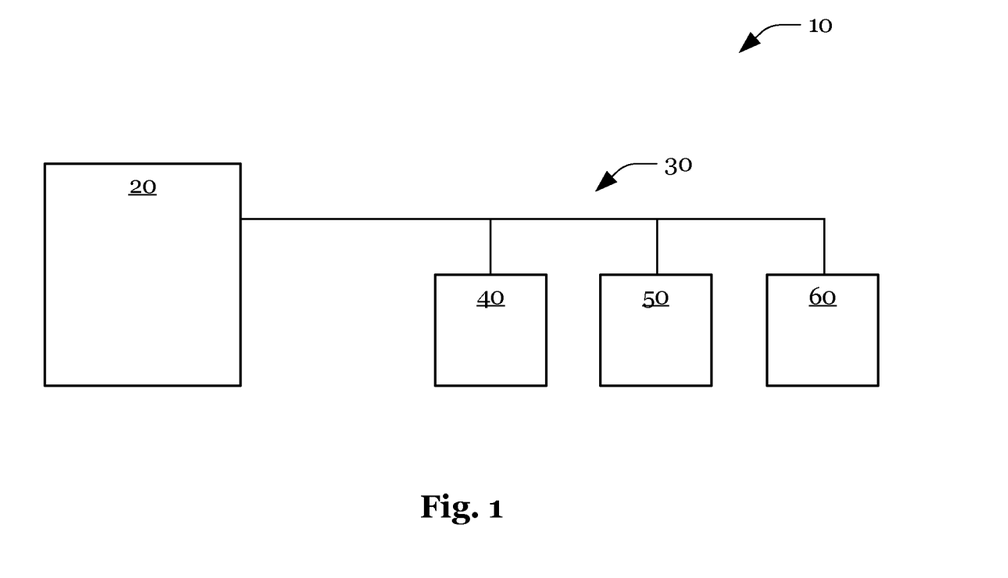
FIG. 1 shows a block diagram of an exemplary fieldbus system.

FIG. 1 shows a block diagram of fieldbus system 10. Fieldbus system 10 includes fieldbus nodes 20, 40, 50 and 60, which are connected to each other via fieldbus 30. Fieldbus node 20 is designed as a superordinate control unit and can be used both for monitoring and for controlling a system, which is controlled by fieldbus system 10. If higher-level control unit 20 monitors a system, higher-level control unit 20 can receive cyclical or acyclic status data from fieldbus nodes 40, 50 and 60 that describe the status of the system and generate an error signal or an alarm signal if the status of the system (substantially) deviates from a desired/permitted status or status range. If higher-level control unit 20 (not only monitors but also) regulates the system, higher-level control unit 20 can receive cyclical or acyclic status data from field bus nodes 40, 50 and 60 and, taking into account the status data, determine control data that is sent to fieldbus nodes 40, 50 and 60.

Figure 2:
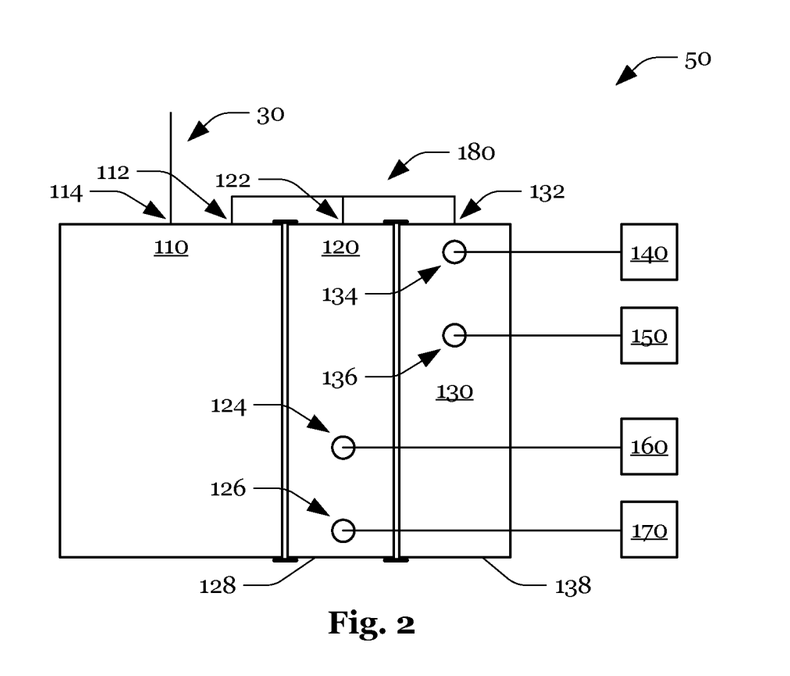
FIG. 2 shows a block diagram of a fieldbus node.

FIG. 2 shows modular fieldbus node 50, formed of module 110 (head station) and two I/O modules 120 and 130 that are provided in housings 128 and 138 and are connected at head station 110, to which field devices 140, 150, 160 and 170, such as sensors and actuators, are connected. During operation, I/O module 120 and I/O module 130 read in sensor signals via input 124 and input 134, respectively, and generate status data from the sensor signals, which are transmitted via interface 122 and interface 132 respectively, local bus 180, and interface 112, to head station 110. In addition to the (fieldbus) interface 114, head station 110 may have a processor and a memory in which information regarding a configuration of head station 110 is stored. The information regarding the configuration of head station 110 can indicate, for example, which or how many I/O modules are lined up at head station 110 and how head station 110 should handle the received status data. Head station 110 can locally process the status data, for example, and/or (if necessary, in modified form) forward the data via interface 114 and fieldbus 30 to higher-level control unit 20. Higher-level control unit 20 (or, in the case of local processing, head station 110) can then generate control data taking into account the status data.

The control data generated by higher-level control unit 20 can then be transmitted via fieldbus 30 to head station 110. The control data transmitted to head station 110 (or generated by head station 110) is then forwarded/transmitted (possibly in modified form) to I/O module 120 and I/O module 130. I/O module 120 and I/O module 130 receive the control data and output control signals corresponding to the control data at output 126 or output 136, to which actuator 150 and actuator 170 are connected. The communication of data between the components of fieldbus system 10 and the mapping of the sensor signals to status data and the mapping of the control data to control signals can be adapted to different application scenarios by configuring fieldbus node 50.

Figure 3:
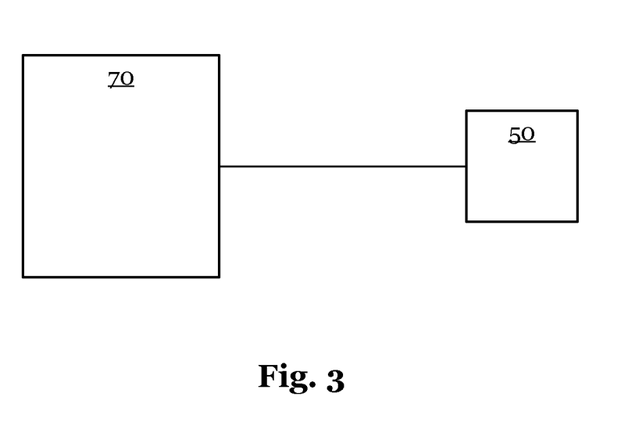
FIG. 3 illustrates the configuration of the fieldbus node by means of a computer connected to the fieldbus node.

FIG. 3 shows fieldbus node 50 and a computer 70 connected to fieldbus node 50 (e.g., a desktop, a laptop, a tablet, etc.), which is set up to configure I/O module 120 and I/O module 130 of fieldbus node 50. Computer 70 can serve alone or mainly for configuration as well as (in addition to configuration) for other tasks. In particular, computer 70 can be part of the higher-level controller 20 and, in addition to the configuration, also perform monitoring and/or control tasks. For example, computer 70 can monitor the system and be set up to switch from one operating mode to another in the event of certain conditions (and, if necessary, to change or update the configuration in the course of the switchover).

Figure 4:
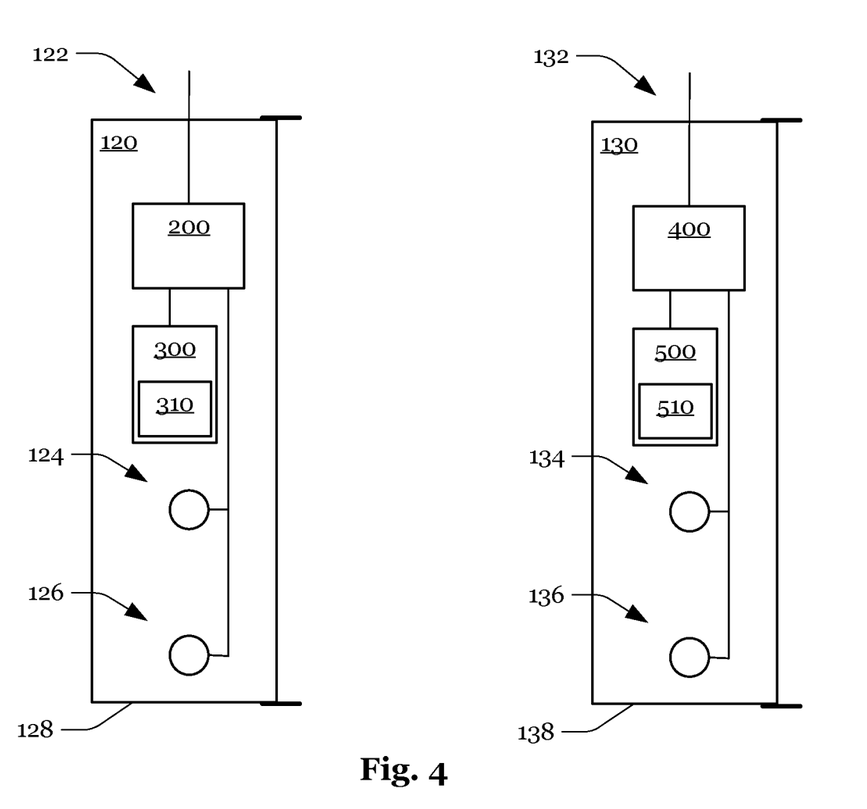
FIG. 4 shows a block diagram of an exemplary I/O module.

As illustrated in FIG. 4, I/O module 120 includes processor 200 and memory 300, wherein I/O module 120 may also not include processor 200. Memory 300 stores configuration data set 310. Configuration data set 310 may, for example, have been transmitted from computer 70 to I/O module 120. Configuration data set 310 specifies how to derive data from signals read in at input 124 and how said data is to be transmitted via local bus 180 to head station 110. Configuration data set 310 further specifies how to derive signals from data transmitted from head station 110 via local bus 180 to I/O module 120 and how to output them to output 126. I/O module 130 includes processor 400 and memory 500, wherein I/O module 130 may also not include processor 400. Memory 500 stores configuration data set 510. Configuration data set 510 may have been, for example, transmitted from computer 70 to I/O module 130. Configuration data set 510 specifies how to derive data from signals read in at the input 134 and how to transmit data via local bus 180 to head station 110. Configuration data set 510 further specifies how to derive signals from data transmitted from head station 110 via local bus 180 to I/O module 130 and to output 136.

Figure 5:
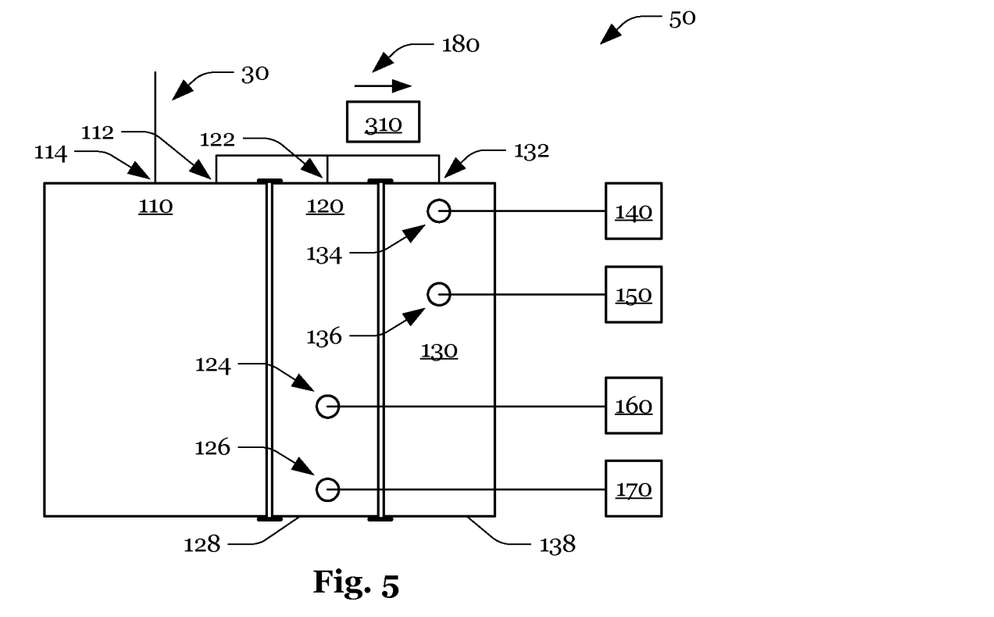
FIG. 5 and FIG. 6 illustrate a first process for configuring an I/O module.
Figure 6:
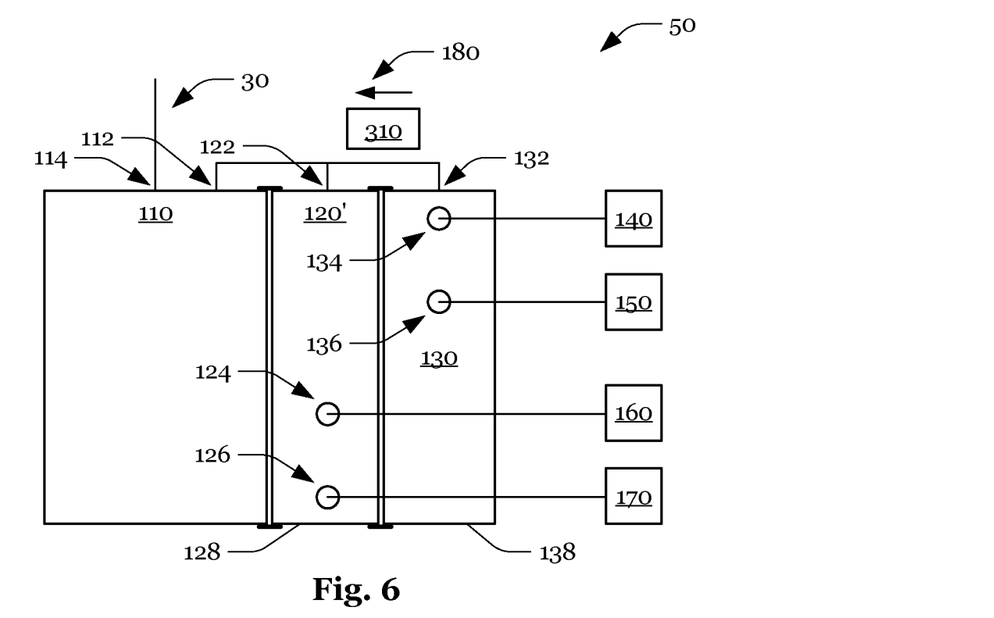

As illustrated in FIG. 5, configuration data set 310 can be transmitted via local bus 180 to I/O module 130 (and if available, to other I/O modules), which thus have configuration data set 310 in addition to the configuration data set 510 required for I/O module 130. If I/O module 120 is exchanged for I/O module 120', which is identical, for example, then configuration data set 310, as illustrated in FIG. 6, can be transmitted from I/O module 130 to I/O module 120'. The transmission can be triggered by I/O module 120' by I/O module 120' requesting the provision of configuration data set 310 or by head station 110 if head station 110 detects I/O module 120' as a new unconfigured I/O module, or by I/O module 130 if I/O module 130 detects that I/O module 120 has been replaced by I/O module 120'. The configuration of I/O module 120' can thus be carried out by the fieldbus node 50 without intervention from the outside.

Figure 7:
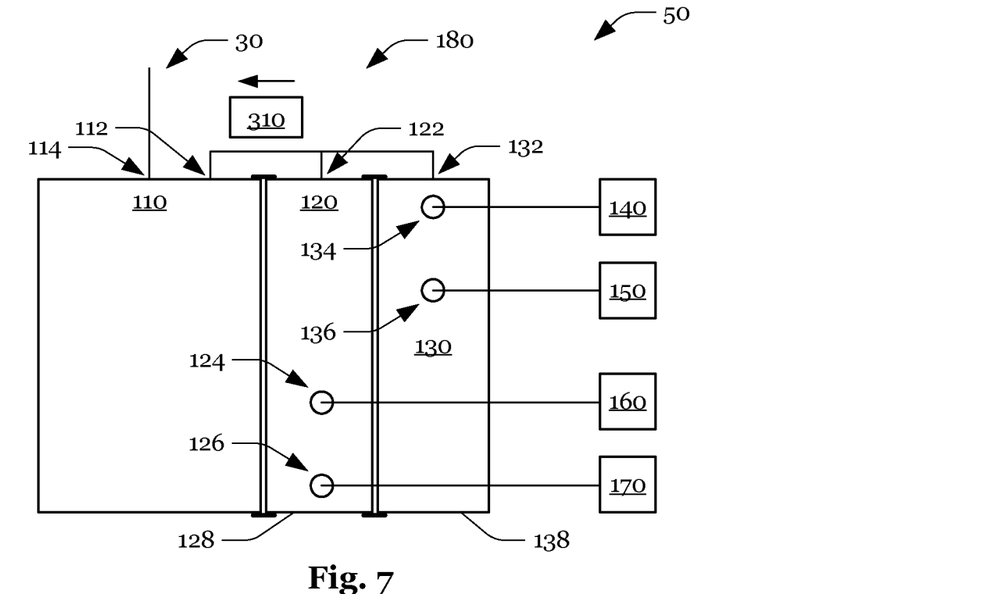
FIG. 7 and FIG. 8 illustrate a second process for configuring an I/O module.
Figure 8:
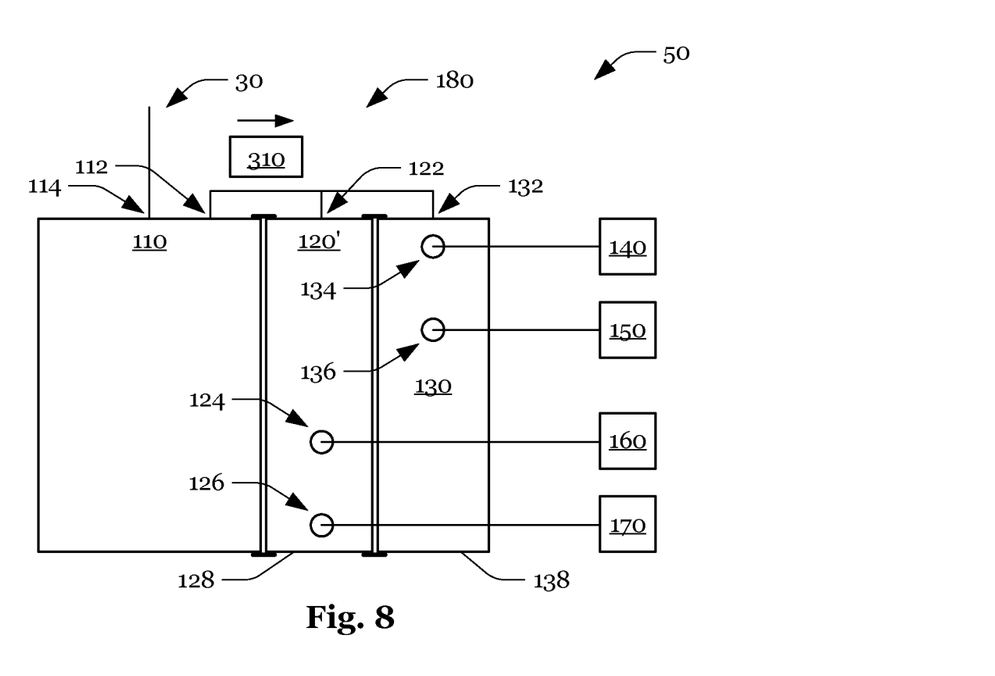

As illustrated in FIG. 7, configuration data set 310 can also be transmitted via local bus 180 (alternatively, or in addition to the transmission to one or more I/O modules) to head station 110, which thus has configuration data set 310 in addition to the configuration data set required for head station 110. If I/O module 120 is exchanged for I/O module 120', which is identical, for example, configuration data set 310, as illustrated in FIG. 8, can be transmitted from head station 110 to I/O module 120'. The transmission can be triggered by I/O module 120', by I/O module 120' requesting provision of configuration data set 310 or by head station 110 if head station 110 comprises I/O module 120' as a new unconfigured I/O module. The configuration of I/O module 120' can thus again be carried out by the fieldbus node 50 without intervention from the outside.

Figure 9:
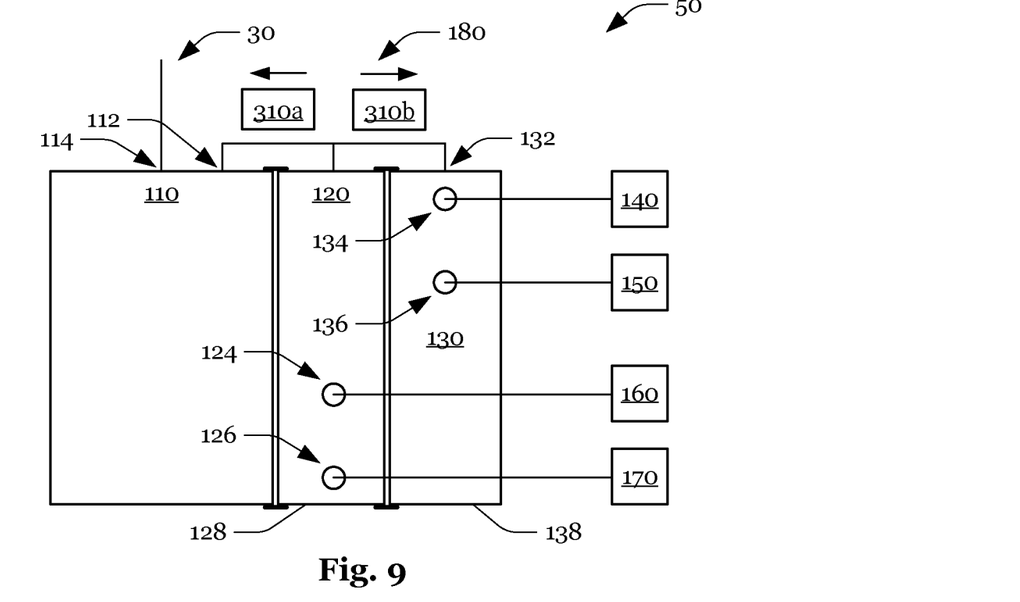
FIG. 9 and FIG. 10 illustrate a third process for configuring an I/O module.
Figure 10:
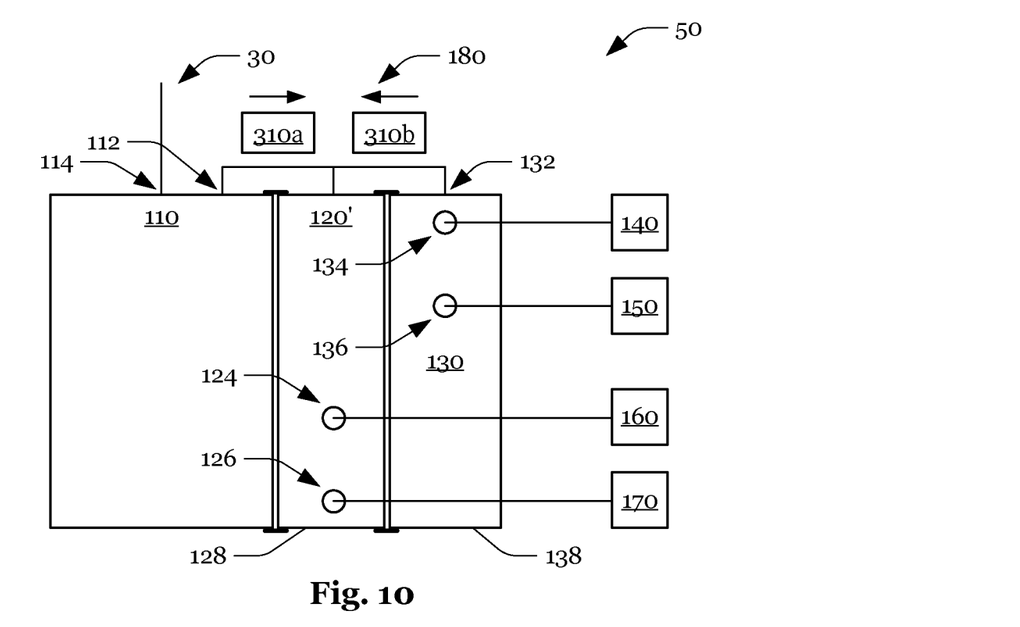

As illustrated in FIG. 9, configuration data set 310 can be split, wherein sub-configuration data set 310a is transmitted via local bus 180 to head station 110 and sub-configuration data set 310b is transmitted via local bus 180 to I/O module 130. If multiple I/O modules are available, the sub-configuration data sets can also be distributed only to the I/O modules). If I/O module 120 is exchanged for I/O module 120', which is identical, for example, sub-configuration data set 310a, as illustrated in FIG. 10, can be transmitted from head station 110 to I/O module 120' and sub-configuration data set 310b can be transmitted from I/O module 130 to I/O module 120'. The transmission can be triggered by I/O module 120' by I/O module 120' requesting the provision of configuration data set 310 or by head station 110 and I/O module 130 if head station 110 detects I/O module 120' as a new unconfigured I/O module and I/O module 130 detects that I/O module 120 has been replaced by I/O module 120'.

Here, too, the configuration of I/O module 120' can thus be carried out by the fieldbus node 50 without intervention from the outside.

Figure 11:
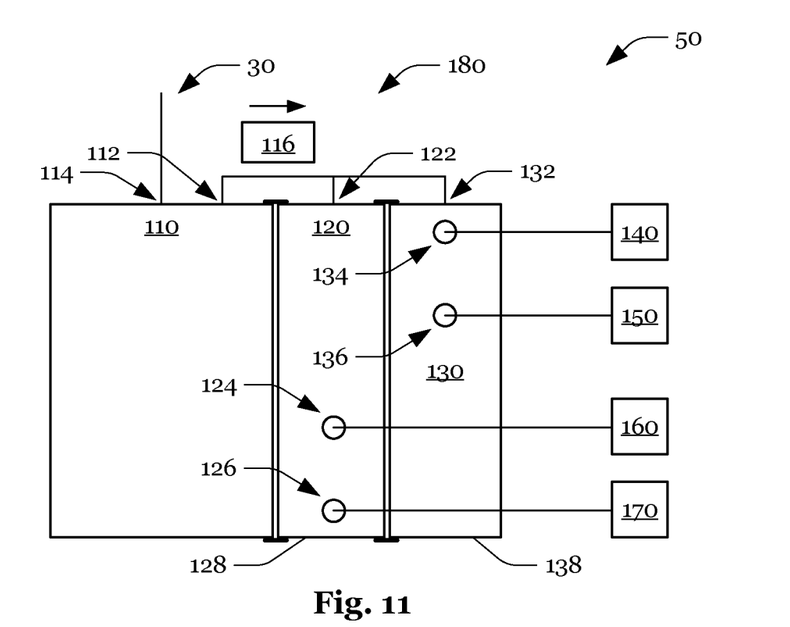
FIG. 11 and FIG. 12 illustrate a process for configuring a head station.
Figure 12:
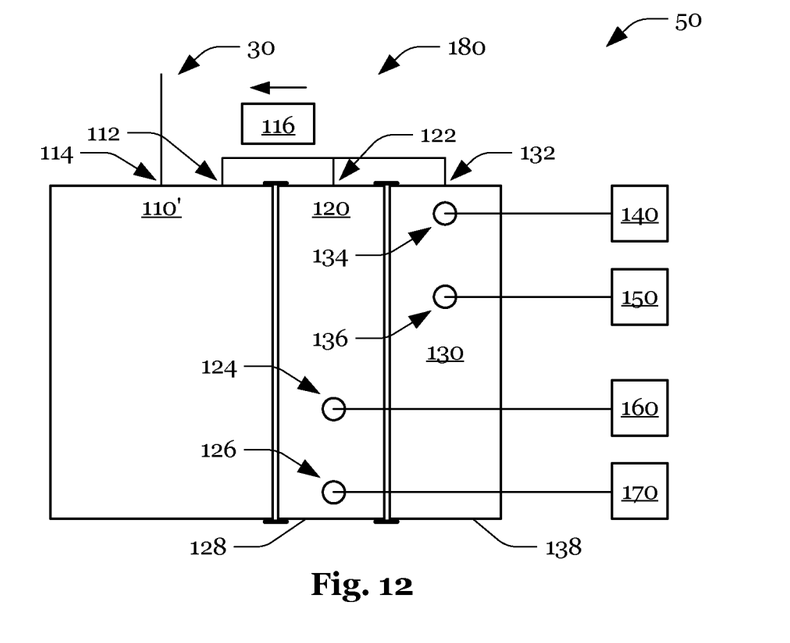

As illustrated in FIG. 11 and FIG. 12, the procedure described above may also be modified to the effect that configuration data set 116 (or a portion of configuration data set 116) is cached by head station 110 on one or more (other) modules of fieldbus node 50 when head station 110 is replaced by head station 110', or in order to wholly or partially restore configuration data set 116, or to refresh or check it (for errors). Configuration data set 116 may comprise, for example, communication settings (e.g., for fieldbus communication), settings for activating/deactivating local interfaces of head station 110 (e.g., a local service interface/USB), settings that are necessary for connecting to web services (e.g., settings for setting up a cloud/server connection) and in principle all settings that can generally be made on head station 110.

Figure 13:
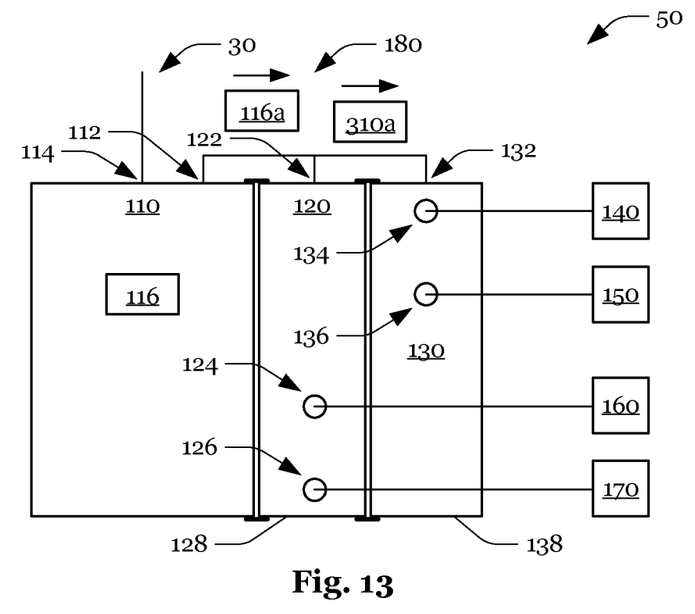
FIG. 13 and FIG. 14 illustrate a fourth process for configuring an I/O module.
Figure 14:
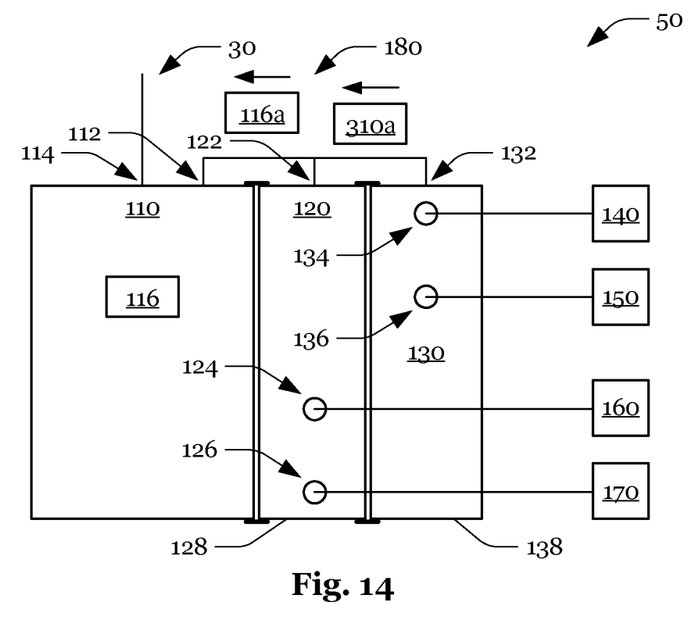

As illustrated in FIG. 13 and FIG. 14, the procedure described above can also be modified in such a way that the configuration data set 310 or the configuration data set 116 is wholly or partially restored, refreshed, or checked (for errors). For example, I/O module 120 can capture an error in configuration data set 310 and request a refresh for the affected portion or for the entire configuration data set 310 after which sub-configuration data set 310*a* (or the entire configuration data set 310) is provided by I/O module 130 and/or another I/O module and/or head station 110. Similarly, head station 110 can capture an error configuration data set 116 and ask for a refresh regarding the affected portion or the entire configuration data set 116, whereupon sub-configuration data set 116*a* (or the entire configuration data set 116) is provided by I/O module 120 and/or I/O module 130.

Figure 15:
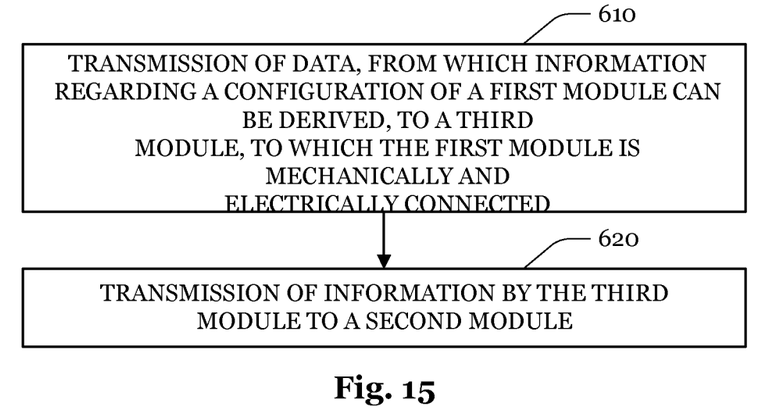
FIG. 15 shows a flowchart with steps shared by the first, second and third processes.

FIG. 15 shows a flowchart with steps performed in the processes illustrated in FIG. 5 to FIG. 10. Thus, in step 610, data from which information regarding the configuration of a first module can be derived is transmitted to a third, to which the first module is mechanically and electrically connected. In step 620, this information is then transmitted by the third module to the second module.

Figure 16:
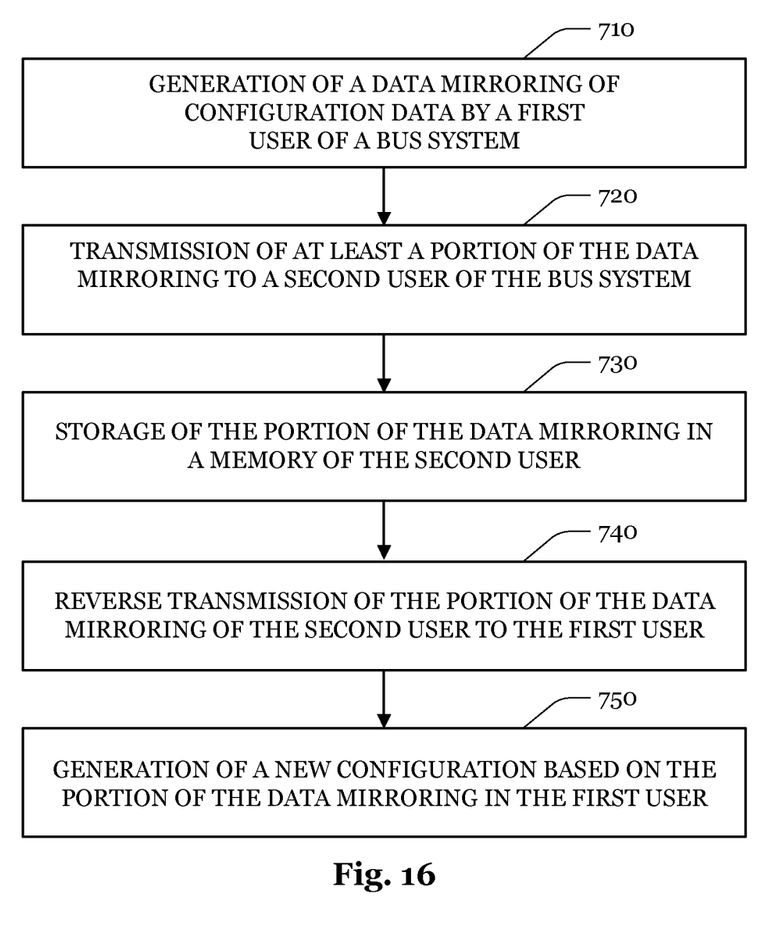
FIG. 16 shows a flowchart with steps of the fourth process.

FIG. 16 shows a flowchart with steps performed in the process illustrated in FIG. 11 and FIG. 12. For example, in step 710, a data mirroring of the configuration data is generated by a first bus user and in step 720, at least a portion of the data mirroring is transmitted to a second bus user. In step 730, the portion of the data mirroring is stored in a memory of the second user. After the portion of the data mirroring is retransmitted from the second user to the first user in step 740, a new configuration is generated in step 750 based on the portion of the data mirroring in the first user.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An input/output module (I/O Module) that is part of a modular fieldbus node that includes a head station, the I/O module comprising:
   a housing to establish a frictional or form-fitting connection connect between the I/O module and a housing of a first module, the first module being another I/O module of the modular fieldbus node or the head station of the modular fieldbus node;
   an interface configured to communicate with the first module; and
   a memory,
   wherein the I/O module is set up to receive data directly from the first module via the interface and store the data in the memory, the data including information regarding a configuration of the first module, and
   wherein the I/O module is set up to transmit the information directly to a second module upon request, and
   wherein the I/O module is set up to transmit the information to the second module if the I/O module determines that the second module replaces the first module.

2. The input/output module according to claim 1, wherein the I/O module determines that the second module replaces the first module when the second module indicates to the I/O module that the second module replaces the first module.

3. The input/output module according to claim 1, further comprising one or more inputs and outputs set up for reading in status signals and for outputting control signals, wherein the I/O module is configurable from data derived from at least one of the status signals or the control signals.

4. A system comprising:
   the I/O module according to claim 1; and
   the first module.

5. The system according to claim 4, further comprising:
   a third module,
   wherein the third module stores second information regarding a configuration of the first module and is set up to transmit the second information to the second module.

6. A bus system comprising:
   a first user;
   a second user; and
   a bus connecting the first user to the second user,
   wherein the first user has configuration data for a configuration of the first user,
   wherein the first user is set up to generate a data mirroring of the configuration data,
   wherein the first user and the second user are set up to transmit at least a portion of the data mirroring directly from the first user to the second user,
   wherein the second user is set up to store the portion of the data mirroring in a memory of the second user,
   wherein the first user and the second user are set up to transmit the portion of the data mirroring directly from the second user back to the first user, and
   wherein the first user is set up to generate a new configuration of the first user based on the portion of the data mirroring received from the second user.

7. A user of a bus system, wherein the user is an I/O module, comprising:
   a bus interface set up to communicate with a second user;
   a processor;
   a memory; and
   one or more electrical connections set up for reading in input signals and for outputting output signals,
   wherein the I/O module is set up to derive data from at least one of the input signals or the output signals, and
   wherein the I/O module is additionally set up to receive and store configuration data of the second user directly from the second user, the configuration data including information regarding a configuration of the second user, and to transmit the information directly to the second user on request.

8. A method for configuring a first user of a bus system with configuration data associated with the first user, the method comprising:

generating a data mirroring of the configuration data by the first user;

transmitting at least a portion of the data mirroring directly from the first user to a second user of the bus system;

storing the portion of the data mirroring in a memory of the second user;

retransmitting the portion of the data mirroring directly from the second user to the first user; and generating, in the first user, a new configuration of the first user based on the portion of the data mirroring received from the second user.

9. The method according to claim 8, wherein the retransmitting of the portion of the data mirroring from the second user to the first user is started if:

it is determined that the first user has been replaced by an identical device; or it is determined that the configuration data of the first user is at least partially unavailable; or an integrity check of the configuration data and of the data mirroring is initiated; or an error of a redundancy check value is determined via the configuration data.

10. The method according to claim 8, wherein the portion of the data mirroring is stored if a redundancy check value via the data mirroring is correct, and wherein the storage of the portion of the data mirroring is confirmed.

* * * * *